United States Patent
Reau et al.

(10) Patent No.: US 6,729,772 B2
(45) Date of Patent: May 4, 2004

(54) SLEEVE FOR FIXING OPTICAL CABLES

(75) Inventors: Ann-Cecile Reau, Pleumeur Bodou (FR); Alain Petit, Pluzunet (FR); Daniel Lecoq, Berhet (FR)

(73) Assignee: France Telecom, Paris (FR)

( * ) Notice: Subject to any disclaimer, the term of this patent is extended or adjusted under 35 U.S.C. 154(b) by 0 days.

(21) Appl. No.: 10/203,400

(22) PCT Filed: Jan. 19, 2001

(86) PCT No.: PCT/FR01/00195

§ 371 (c)(1),
(2), (4) Date: Jan. 30, 2003

(87) PCT Pub. No.: WO01/59500

PCT Pub. Date: Aug. 16, 2001

(65) Prior Publication Data

US 2003/0152335 A1 Aug. 14, 2003

(30) Foreign Application Priority Data

Feb. 8, 2000 (FR) .............................. 0001616

(51) Int. Cl.$^7$ ................................. G02B 6/36
(52) U.S. Cl. ........................................ 385/86
(58) Field of Search ............... 385/86, 88, 77, 385/78, 92, 94, 147, 139

(56) References Cited

U.S. PATENT DOCUMENTS 5,181,267 A * 1/1993 Gerace et al. ............... 385/86
5,293,581 A * 3/1994 DiMarco ..................... 385/76
5,473,723 A * 12/1995 Stockman et al. .......... 385/134
5,675,682 A * 10/1997 De Marchi .................. 385/77
5,748,819 A * 5/1998 Szentesi et al. ............. 385/60
5,835,653 A * 11/1998 Barkus ........................ 385/87
6,302,594 B1 * 10/2001 Lee ............................. 385/87
6,318,904 B1 * 11/2001 Reichle ....................... 385/78
6,550,978 B2 * 4/2003 De Marchi .................. 385/60

FOREIGN PATENT DOCUMENTS

| DE | 3732024 A | 4/1989 |
| FR | 2707435 | 1/1995 |
| JP | 09304673 | 11/1997 |

\* cited by examiner

*Primary Examiner*—Tulsidas C. Patel
(74) *Attorney, Agent, or Firm*—Cohen, Pontani, Lieberman & Pavane

(57) ABSTRACT

A fixing sleeve for optical cables comprises along a common axis (A), both a first portion (11) that is substantially cylindrical and a second portion (12) that is substantially conical, said first and second portions being pierced by an axial bore (13). The sleeve (10) carries along its entire length a continuous slot communicating with said axial bore (13), the slot comprising a longitudinal first slot (110) in the first portion (11) of the sleeve, and a spiral second slot (120) in the second portion (12) of the sleeve. The sleeve is applicable to laying optical cables inside buildings.

6 Claims, 1 Drawing Sheet

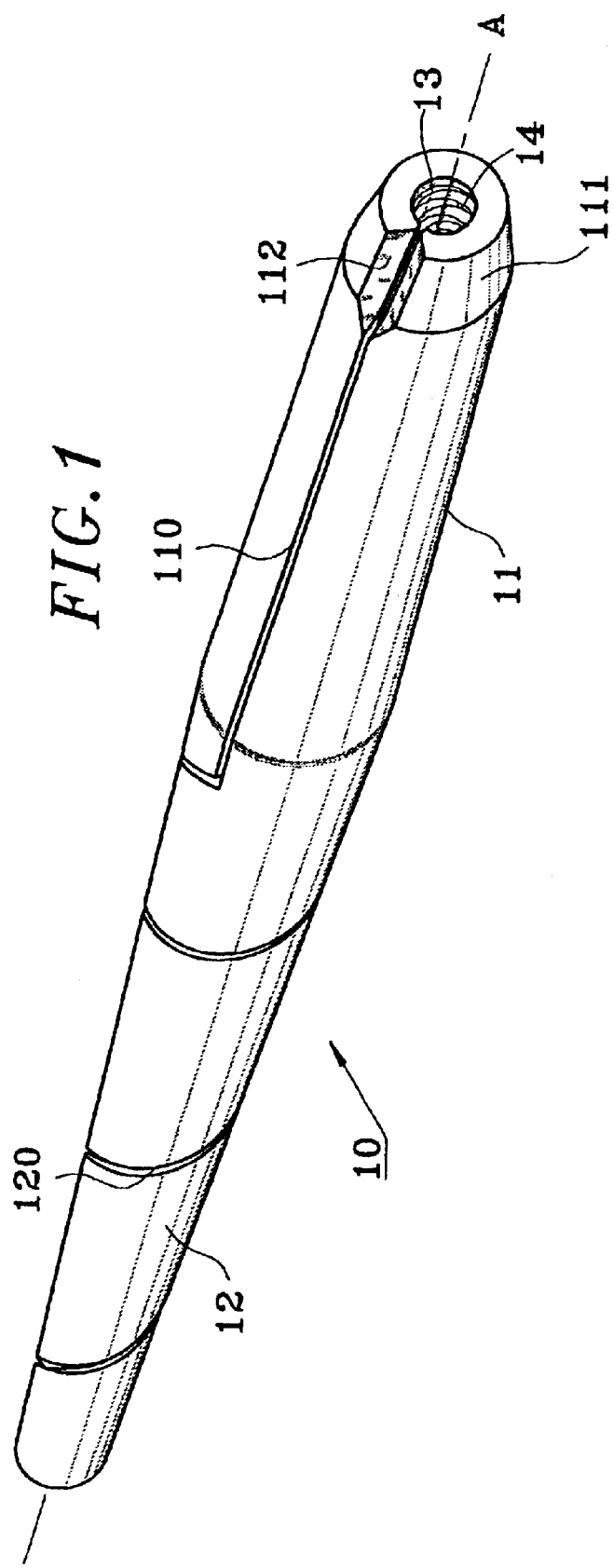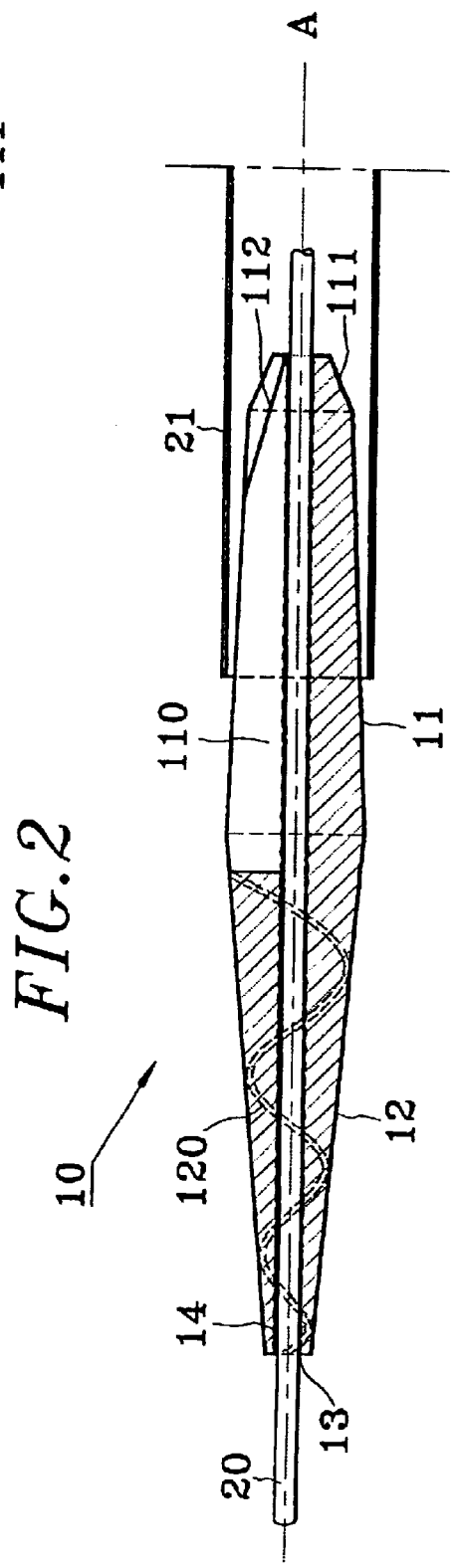

SLEEVE FOR FIXING OPTICAL CABLES

This application is a U.S. National Phase Application under 35 USC 371 of International Application PCT/FR01/00195 (not published in English) filed Jan. 19, 2001.

FIELD OF THE INVENTION

The present invention relates to a fixing sleeve for optical cables.

A particularly advantageous application of the invention lies in the field of laying optical cables inside buildings.

BACKGROUND OF THE INVENTION

In order to lay optical cables inside a building, it is known that said cables can be inserted in precabling tubes that are initially installed in the infrastructure of buildings and that are designed for this purpose, for example cable ducts.

Optical cables are installed in precabling tubes in conventional manner using various techniques such as carrying, blowing, pulling or pushing, for example. In general, the optical cables are mounted so as to be free inside the tubes, which means that they are particularly exposed to various stresses, such as traction or bending stresses at the points where they leave the tubes. These stresses are usually generated by the handling that is applied to cables during a connection operation, for example, and they run the risk of damaging the cables severely if they fail to comply with limit values, particularly concerning the radius of curvature of the cables.

SUMMARY OF THE INVENTION

One object of the present invention is to hold an optical cable still in order to avoid harmful traction movements.

Another object of the present invention is to limit cable bending to some minimum radius of curvature.

These and other objects are attained in accordance with one aspect of the present invention directed to a fixing sleeve that comprises, along a common axis, both a first portion that is substantially cylindrical and a second portion that is substantially conical, said first and second portions being pierced by an axial bore, and in that the sleeve carries along its entire length a continuous slot communicating with said axial bore, the slot comprising a longitudinal first slot in the first portion of the sleeve, and a spiral second slot in the second portion of the sleeve.

Thus, as explained in greater detail below, when an optical cable is placed in the fixing sleeve of the invention, which sleeve is inserted in a precabling tube via said first portion, the optical cable is held in place inside the axial bore which extends along the entire length of the sleeve, thereby significantly limiting movements of the cable inside the sleeve. In particular, longitudinal movement can be greatly reduced because, in accordance with the invention, said axial bore has an irregular wall that is corrugated or granular, for example, thereby increasing friction between the cable and the bore. Nevertheless, it should be observed that the spiral shape of the second slot does indeed allow the cable to bend to a certain extent so as to enable it to accommodate particular geometrical configurations where the cable needs to be curved by a given amount in any direction. Nevertheless, this bending remains controlled and limited to a maximum amount of curvature which is determined by the conical shape of the second portion, the pitch of the spiral, and the elasticity of the material constituting the fixing sleeve of the invention.

In order to make it easier to insert the fixing sleeve in precabling tubes, provision is also made in the invention for said first portion to be slightly frustoconical. This disposition also has the advantage of holding the cable more securely in the axial bore since the radial forces developed while inserting the sleeve in the tube tend to clamp the cable more firmly inside the bore. This advantageous effect is made even more perceptible when said sleeve is made of elastomer.

It should also be observed that an optical cable can be put into place in the fixing sleeve of the invention very simply and quickly, since it suffices to open the continuous slot in the sleeve by acting against the elasticity of the sleeve material, to insert the cable therein, and then allow the slot to reclose under the effect of the sleeve returning elastically to its initial shape. There is thus no need to cut the cable or to thread it through the sleeve. Inserting the cable into the sleeve is made even easier when, in accordance with the invention, said first longitudinal slot has an insertion flare at one end.

Finally, the invention presents other advantages such as protecting cables in precabling tubes and closing said tubes so as to seal them effectively against foreign bodies (dust etc.).

BRIEF DESCRIPTION OF THE INVENTION

The following description refers to the accompanying drawing given by way of non-limiting example and explains clearly what the invention consists in and how it can be implemented.

FIG. 1 is a perspective view of a fixing sleeve in accordance with the invention.

FIG. 2 is a longitudinal section view of the fixing sleeve of FIG. 1.

DETAILED DESCRIPTION OF THE DRAWINGS

FIGS. 1 and 2 are a perspective view and a section view of a fixing sleeve 10 for optical cables, and more particularly for cabling the insides of buildings via precabling tubes.

The sleeve 10 is made of an elastic material, and in particular of an elastomer, and it comprises two distinct portions extending along a common axis A. A first portion 11 is substantially cylindrical, while advantageously being slightly frustoconical so as to make it easier to insert the sleeve 10 into a precabling tube 21, as can be seen more clearly in FIG. 2. This first portion 11 is also provided with an end chamfer 111 for facilitating insertion of the sleeve 10 into the tube 21. A second portion 12 is substantially conical and its cone angle is more marked than that of the first portion 11. Any bending of this second portion, and thus any bending of the cable 20 outside the tube 21 depends on the cone angle given to the second portion 12.

An axial bore 13 is provided along the sleeve 10, substantially in its center, so as to be able to receive an optical cable 20. That is why the diameter of the axial bore 13 can be of the same order as the diameter of the optical cable 20.

As can be seen more clearly in FIG. 1, the sleeve 10 is split continuously over its entire length so as to cause the outside of the sleeve to communicate with the axial bore 13 for the purpose of being able to insert the cable 20 into the bore 13. More precisely, a first slot 110 is formed in a longitudinal configuration in the first portion 11 of the sleeve, while a second slot 120 is formed in a spiral configuration in the second portion 12 of the sleeve.

The fixing sleeve shown in FIGS. 1 and 2 is used as follows.

In a first operation, an optical cable 20 needs to be inserted inside the sleeve 10. For this purpose, the slots 11 and 12 are opened manually by exerting a reasonable amount of force against the elastic return force tending to urge together the lips of the slots. This putting into place of the cable 20 is made easier by an insertion flare 112 formed at the end of the first longitudinal slot 110 so as to enable the cable 20 to penetrate into the bore 13 merely by applying finger pressure. Once the cable 20 is in place inside the sleeve 10, the sleeve returns to its initial shape when the externally applied force is released. This operation is performed manually without using any special tooling and without having to cut the cable or to thread it through the sleeve. Once the optical cable 20 has been put into place in this way, it is held along the entire length of the axial bore 13 by hydrostatic clamping due to the material of the sleeve 10 transmitting forces generated by inserting the sleeve in the tube 21. The force with which the optical cable is held increases because the inside wall 14 of the sleeve is irregular, and in particular corrugated or granular, for example.

Thereafter, said first portion 11 of the sleeve 10 is inserted into the precabling tube 21 until the sleeve is held by clamping inside the tube. The tube is then properly closed and leaktight. In this position, the cable 20 is insensitive to any longitudinal movements that may be applied to the cable inside the tube 21. Nevertheless, the spiral shape of the slot 120 in the conical portion 12 ensures that the sleeve is flexible to a certain extent, complying with bending limits that are compatible with the ability of the cable 20 to withstand bending.

What is claimed is:

1. A fixing sleeve for optical cables, the sleeve being characterized in that it comprises, along a common axis (A), both a first portion (11) that is substantially cylindrical and a second portion (12) that is substantially conical, said first and second portions being pierced by am axial bore (13), and in that the sleeve (10) carries along its entire length a continuous slot communicating with said axial bore (13), the slot comprising a longitudinal first slot (110) in the first portion (11) of the sleeve, and a spiral second slot (120) in the second portion (12) of the sleeve.

2. A fixing alcove according to claim 1, characterized in that said first portion (11) of the sleeve (10) presents an end chamfer (111).

3. A fixing sleeve according to claim 1, characterized in that said longitudinal first slot (110) has an insertion flare (112) at its end.

4. A fixing sleeve according to claim 1, characterized in that sail first portion (11) is slightly frustoconical.

5. A fixing sleeve according to claim 1, characterized in that said axial bore (13) presents an inside wall (14) that is irregular.

6. A fixing sleeve according to claim 1, characterized in that said sleeve (10) is made of elastomer.

* * * * *